(12) United States Patent
Patmont et al.

(10) Patent No.: US 8,434,775 B2
(45) Date of Patent: May 7, 2013

(54) WHEELCHAIR HAVING TORSION-ACTING SHOCK ABSORPTION AND DETACHABLE DRIVE TRAIN

(75) Inventors: Steven J Patmont, Gardnerville, NV (US); Gabriel S. Patmont, Gardnerville, NV (US); Trevor Snowden, Gardnerville, NV (US)

(73) Assignees: Steven J. Patmont, Minden, NV (US); Gabriel S. Patmont, Minden, NV (US)

( * ) Notice: Subject to any disclaimer, the term of this patent is extended or adjusted under 35 U.S.C. 154(b) by 252 days.

(21) Appl. No.: 12/387,825

(22) Filed: May 6, 2009

(65) Prior Publication Data

US 2010/0012400 A1 Jan. 21, 2010

Related U.S. Application Data

(60) Provisional application No. 61/050,721, filed on May 6, 2008.

(51) Int. Cl.
*A61G 5/10* (2006.01)

(52) U.S. Cl.
USPC .................................................. 280/250.1

(58) Field of Classification Search ............... 280/250.1
See application file for complete search history.

(56) References Cited

U.S. PATENT DOCUMENTS

| | | | | |
|---|---|---|---|---|
| 4,339,013 A * | 7/1982 | Weigt | ............ | 180/6.5 |
| 4,392,668 A * | 7/1983 | Mulholland | ............ | 280/86.1 |
| 4,861,056 A * | 8/1989 | Duffy et al. | ............ | 280/250.1 |
| 6,217,114 B1 * | 4/2001 | Degonda | ............ | 297/325 |
| 7,032,917 B1 * | 4/2006 | Chelgren | ............ | 280/304.1 |
| 7,243,935 B2 * | 7/2007 | Beumer | ............ | 280/250.1 |
| 2008/0116660 A1 * | 5/2008 | Nicholls | ............ | 280/286 |

* cited by examiner

*Primary Examiner* — Kevin Hurley
(74) *Attorney, Agent, or Firm* — Steven A. Nielsen; Allman & Nielsen, P.C.

(57) ABSTRACT

A wheelchair having torsion-acting shock absorbers from which cantilevered swing arms connected to drive wheels are connected is disclosed. The wheelchair incorporates a compact, collapsible power scooter that attaches to the wheelchair and presents a pair of handlebars having an accelerator and a brake, thus enabling the rider to propel him or herself by a power drive train rather than by hand.

5 Claims, 8 Drawing Sheets

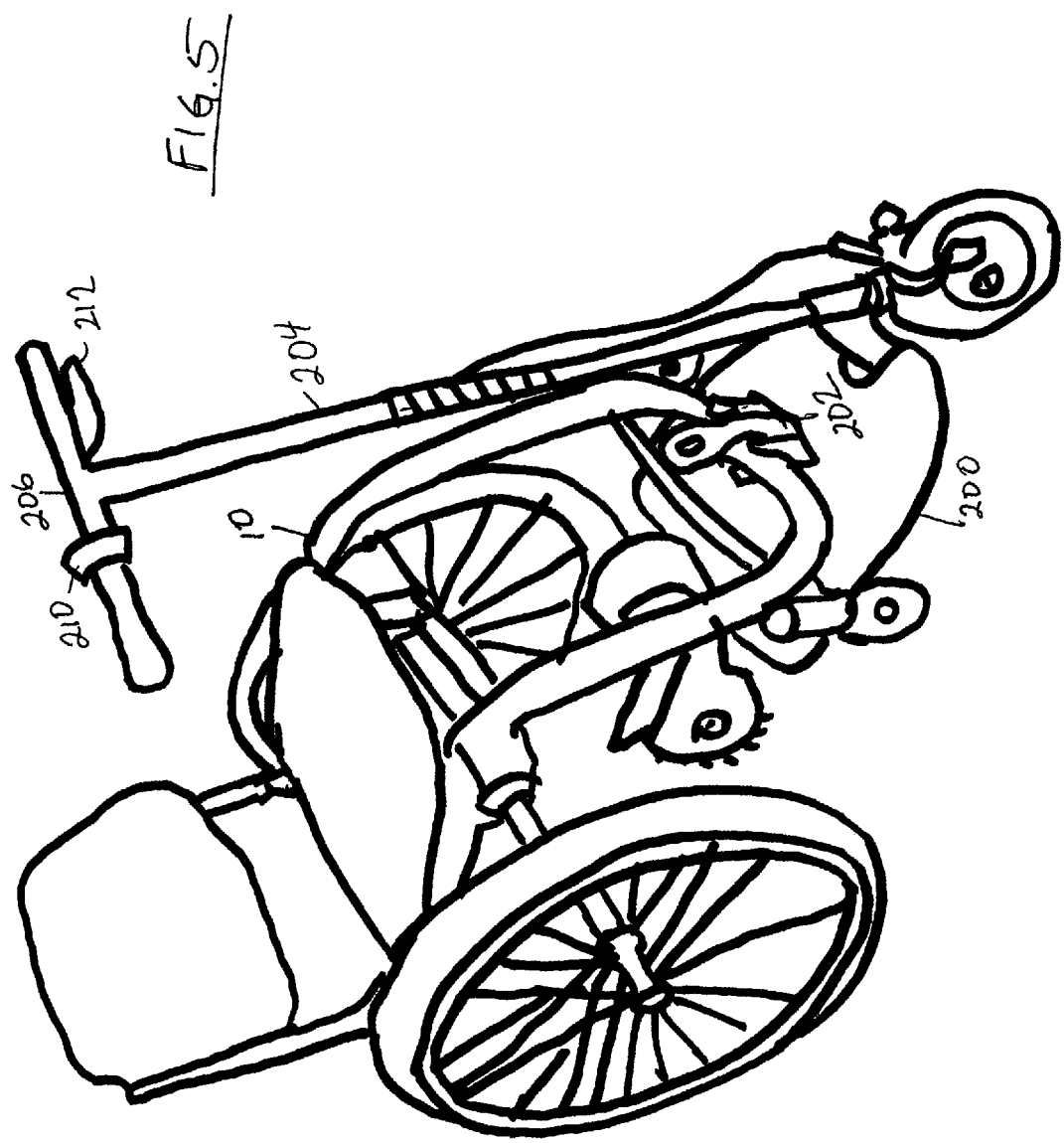

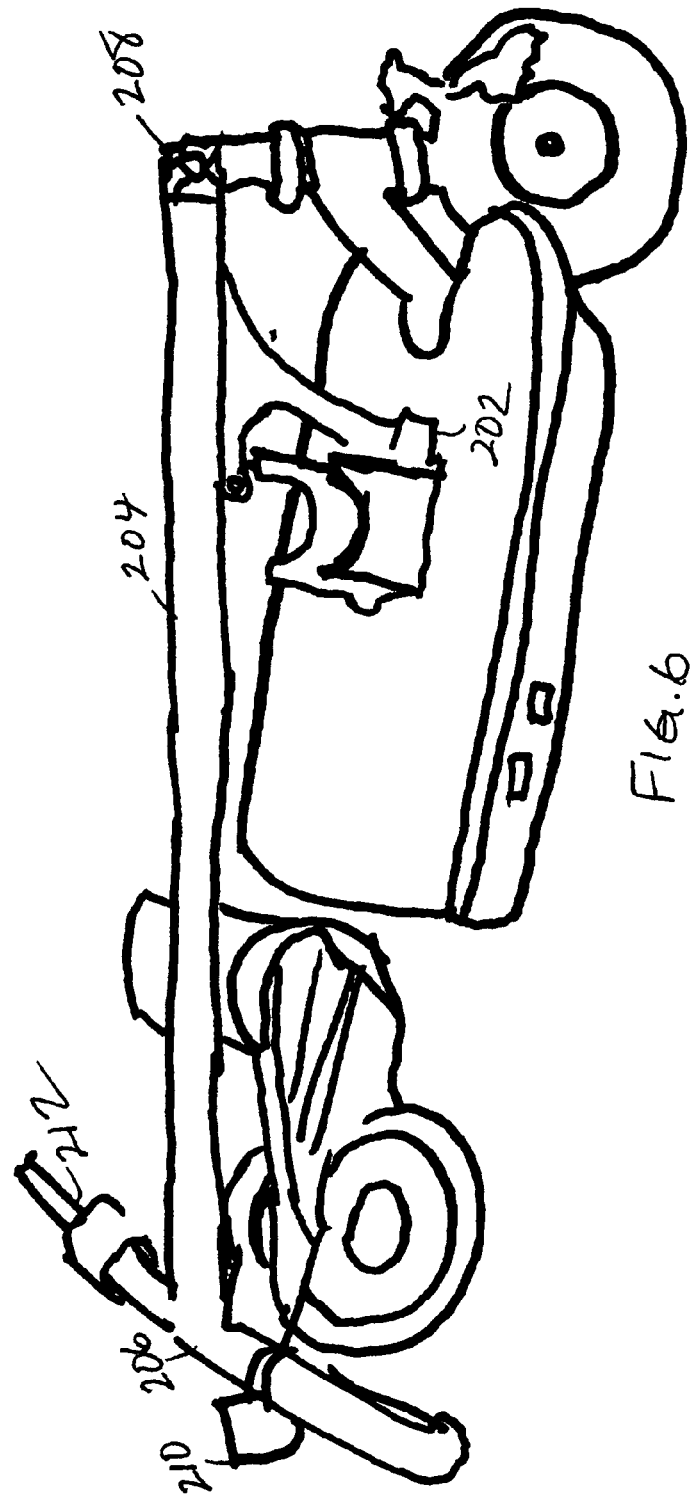

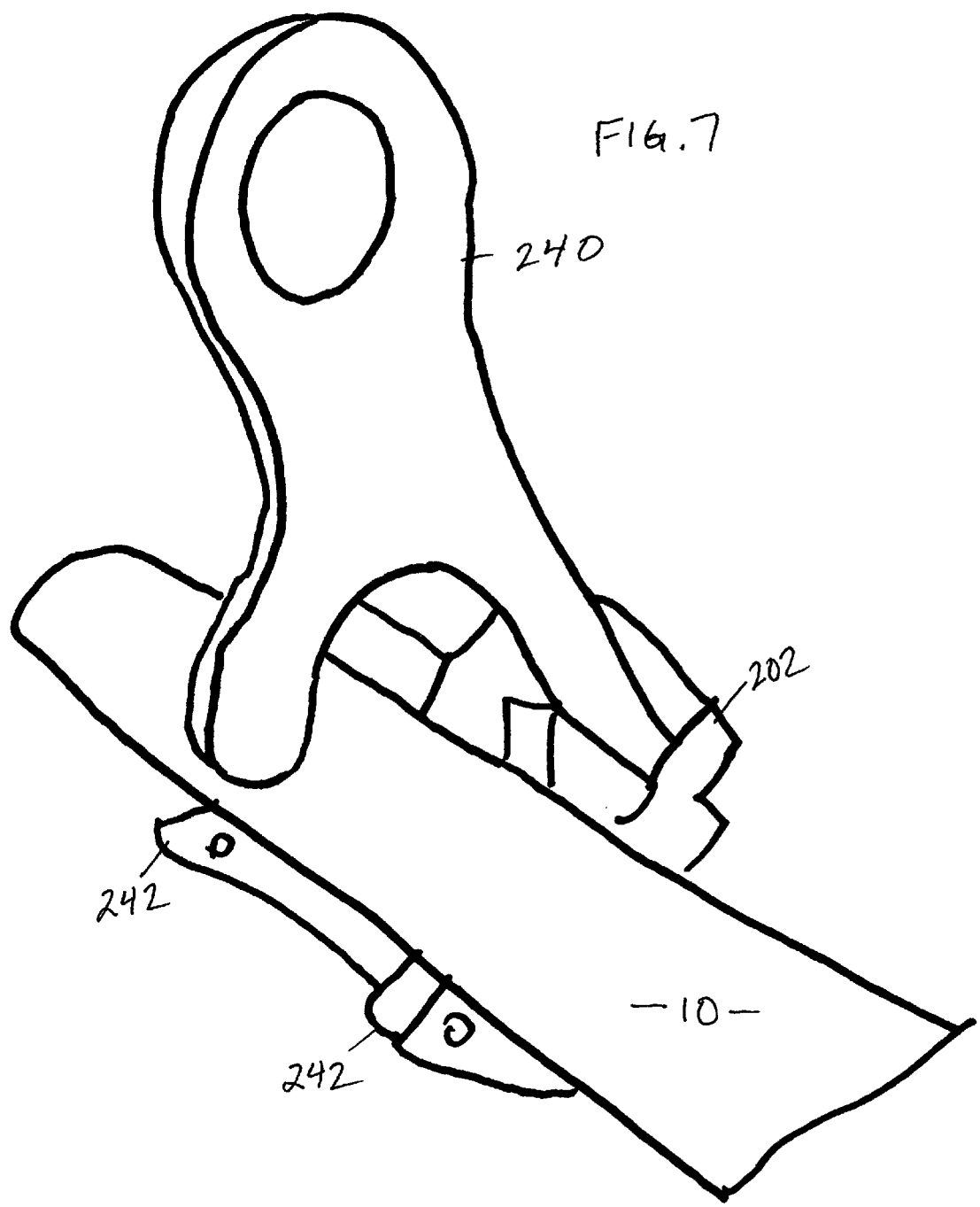

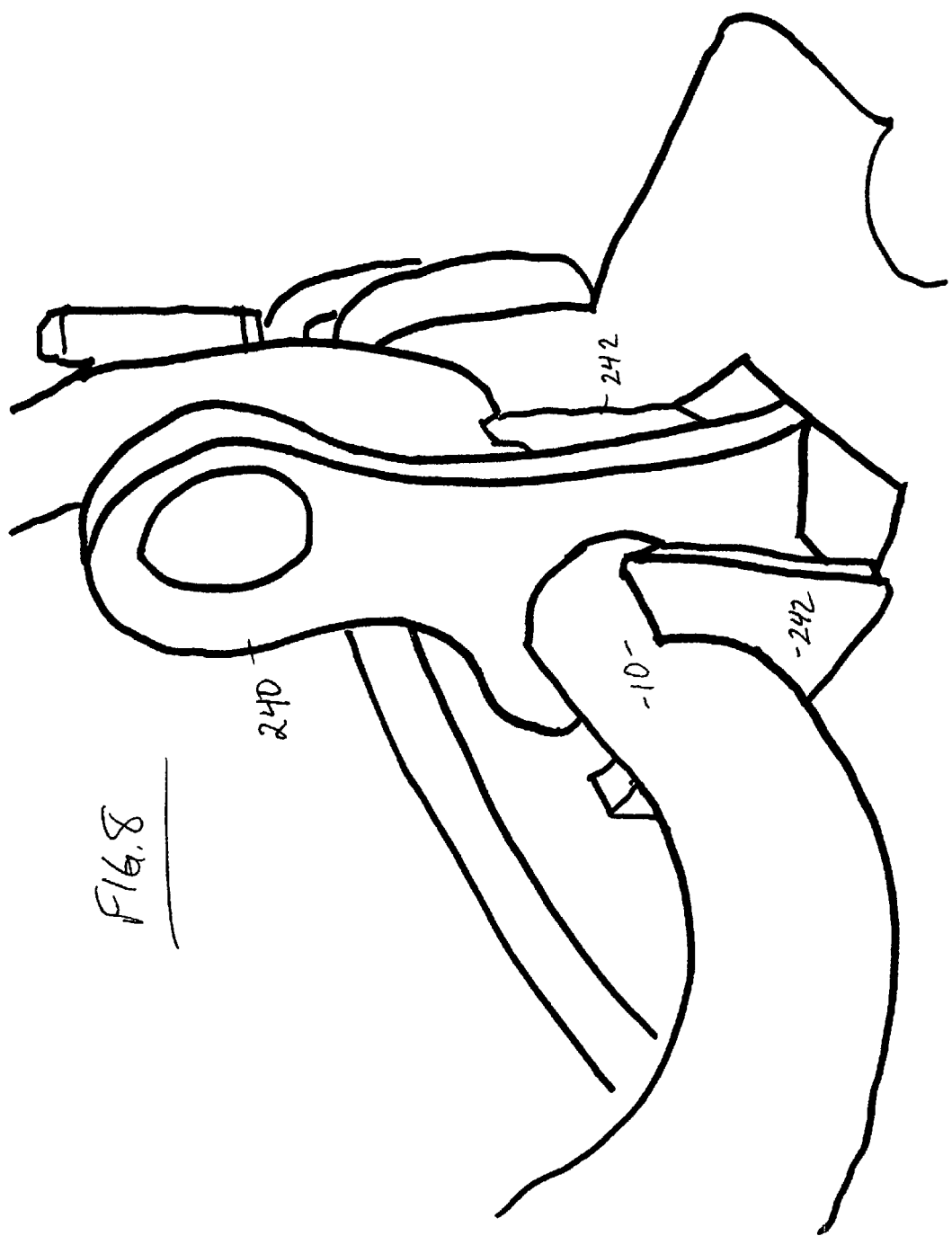

WHEELCHAIR HAVING TORSION-ACTING SHOCK ABSORPTION AND DETACHABLE DRIVE TRAIN

CLAIM OF PRIORITY

This application claims priority to U.S. Provisional Patent Application Ser. No. 61/050,721, filed May 6, 2008, incorporated by reference herein in its entirety.

FIELD OF THE INVENTION

The present invention relates generally to wheelchairs. Specifically, the present invention relates to a wheelchair having a frame formed from a continuous tube having four bends and elastomeric, torsion-acting shock absorbers on which independent, cantilevered swing arms are mounted, from which rear wheels are suspended.

BACKGROUND OF THE INVENTION

Wheelchairs have been in use in our mobile society for more than a century. Wheelchairs are typically used by elderly and disabled people, or by people recovering from surgery, injury or illness. However, wheelchairs typically fall short of providing desired mobility to their users in a number of aspects. First, wheelchairs are typically designed for smooth surfaces, such as hospital floors and concrete sidewalks. The wheels are generally thin, with solid rubber tires. A ring is placed on the outside of each of the rear wheels, providing a gripping surface for those riders who are able to propel themselves by pushing forward on the rings and thus turning the wheels. While this arrangement works fine for short distances over smooth surfaces, prolonged use by the seated rider can damage the soft tissue in the rider's shoulders, thus rendering the rider less mobile over time. Furthermore, the design of the thin, solid rubber tire makes it difficult to propel such a chair over uneven surfaces, such as sidewalks, curbs, and the like, and accommodations must be made in the form of ramps to allow a wheelchair to safely pass over them.

The size of typical wheelchairs also suffers shortcomings. The width of a typical hospital-style wheelchair requires larger doorways, and the weight of such a chair makes it difficult to load such a chair in an automobile, and often involves costly modifications to an automobile to swing the chair around from the side of an automobile to a stored position behind the automobile.

Modified wheelchairs have been developed in recent decades to provide a smaller, lighter wheelchair. Wheelchair racing is now a competitive sport around the world. Inflated tires have been used to provide some sort of shock absorption and safer operation over uneven surfaces and at higher speeds. However, with these improvements comes the desire for wheelchair riders to go farther and faster, thus increasing the magnitude of shock delivered to the seated rider, and more difficulty traversing uneven surfaces. In such cases, additional injury can be sustained to the rider's spine, as inflated tires do not provide sufficient shock absorption to protect the rider in many cases. For example, while some riders can take their wheelchair directly over a curb without a ramp, this can damage the spine of the rider, especially over a large number of instances. Self-propulsion of these wheelchairs still results in soft tissue injury to the rider's shoulders.

Electric wheelchairs eliminate the shoulder injury, but suffer their own shortcomings. Electric wheelchairs are heavy, expensive, and more difficult to load into and out of an automobile than conventional wheelchairs. More importantly, an electric wheelchair can leave a rider stranded if the battery is drained or there is some sort of failure in the drive train. These chairs are also unsuited for uneven surfaces, so the mobility of the rider is limited even by the best electric wheelchairs. Thus, there is a heartfelt need for an improved wheelchair design that increases the rider's mobility, protects the rider from shoulder injury, and also protects the rider from shocks delivered from impact to the wheels over uneven surfaces.

SUMMARY OF THE INVENTION

In one aspect, the present invention solves the problems described above by presenting a lightweight, compact wheelchair having torsion-acting shock absorbers from which cantilevered swing arms connected to drive wheels are connected. The wheelchair of the present invention also incorporates a compact, collapsible power scooter that attaches to the wheelchair and presents a pair of handlebars having an accelerator and a brake, thus enabling the rider to propel him or herself by a power drive train rather than by hand, thus eliminating damage to the soft tissue of the shoulders.

In another aspect, the wheelchair of the present invention provides an easily-disassembled wheelchair that is easier to load into an automobile than previous designs, by incorporating a push button release that allows the rear wheels to be easily removed from the frame of the wheelchair, and a tubular frame bent from a continuous length of substantially cylindrical, lightweight metal tubing.

In yet another aspect, the wheelchair of the present invention incorporates a "toe-in" or camber of the rear wheels with respect to the forward direction of the wheelchair, wherein the distance between the frontmost points of the wheels is slightly less than the distance between the rearmost points of the wheels. Combined with the torsion-acting shock absorption system that suspends the rear wheels, a rider is able to propel himself or herself forward by shifting upper body weight from side to side in a rocking motion to propel the wheelchair forward.

The primary objective of the present invention is to provide a lightweight, compact wheelchair with a very effective and maintenance-free suspension system that supports the rider over a pair of manual drive wheels that absorb shock through a pair of independent cantilevered swing arms through elastomeric torsion dampening mechanisms.

It is an objective of the present invention to provide a wheelchair with independent main wheel suspension that does not lose contact with the ground during traversal of uneven surfaces.

It is yet another object of the present invention to provide a wheelchair that is inexpensive to manufacture, yet can handle rigorous surface conditions that currently prevent traversal by traditional wheelchairs.

It is a further object of the present invention to provide a wheelchair with a minimum of movable parts including the complex mechanisms of conventional pneumatic, hydraulic, or metal spring-based shock absorbers. It is a further object of the present invention to provide a unibody frame composed of a continuous piece of lightweight tubing that serves not only as the base for the seat and seat back but also supports the rider's feet.

An additional significant feature of the present invention is a seat which, by virtue of the elastic of the torsion-damping mechanism, rotates forward when unoccupied by a rider to permit easy transition of the rider onto the wheelchair.

A portable drive train is provided in an embodiment of the present invention that in the form of a power scooter having a connection to the frontmost edge of the frame of the wheelchair of the present invention, and presenting to the rider a handlebar set connected to a steerable front wheel, and an accelerator and a brake control. In an embodiment, the main tube of the scooter folds down against the deck of the scooter, so that when not in use, the scooter can be laid across the lap of a seated rider.

Numerous other features and advantages of the present invention will become apparent upon reading the following detailed description, when considered in conjunction with the drawings, in which:

BRIEF DESCRIPTION OF THE DRAWINGS

FIG. 5 is a perspective view of the wheelchair of the present invention attached to a folding scooter;

FIG. 6 is a perspective view of the scooter in its folded position;

FIG. 7 illustrates the cradle and hook mechanism for locking the wheelchair frame to the folding scooter; and FIG. 8 illustrates the cradle and hook mechanism in its locked position.

DETAILED DESCRIPTION OF THE DRAWINGS

Figure 1:
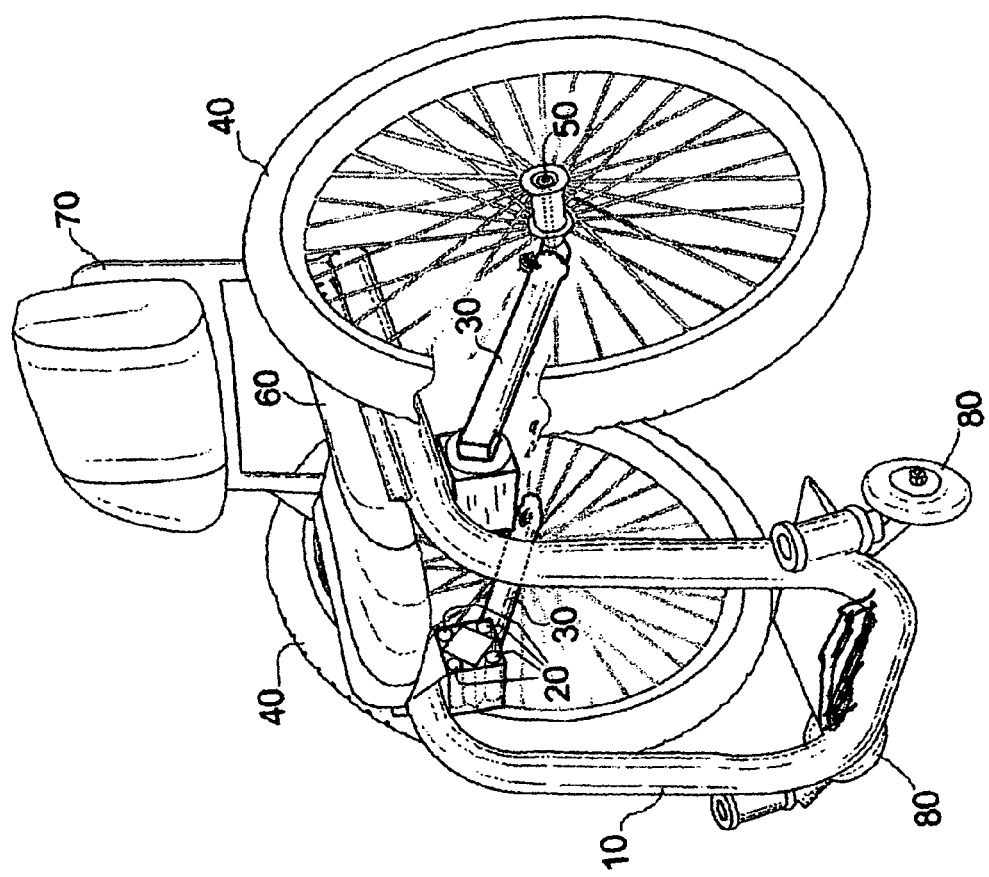
FIG. 1 is a perspective view showing the wheelchair of the present invention.

Directing attention to FIG. 1, there is shown generally a wheelchair in accordance with the present invention having frame 10. Frame 10, in an embodiment, is of a unibody configuration formed from a continuous length of lightweight tubing such as aluminum, carbon fiber, fiberglass, or thermoplastic tubing having four bends formed in its length. Mounted to frame 10 are elastomeric, torsion-acting shock absorbers 20. Torsion-acting shock absorbers 20 employ compressible material that absorbs shock delivered from a wheel connected to a first, inner portion of shock absorber 20, thus lessening the amount of shock transferred to an outer portion of shock absorber 20. A pair of independent swing arms 30 are rotationally mounted to the inner portions of shock absorbers 20 and connect to wheels 40 having quick-release axles 50, such as through the use of a ball locking pin or quick release positive locking (pip) pin, thus allowing easy assembly and disassembly of the wheelchair of the present invention. Wheels 40 can be lightweight, spoked wheels of the type found on traditional wheelchairs or selected from a variety of bicycles and racing wheelchairs, depending on application. With quick-release fasteners 50, wheels of different types can be easily selected by the user based on terrain requirements, such as choosing between mountain bike tires or thin solid-filled tires, and re-configuring the wheelchair of the present invention accordingly.

Seat bottom 60, and, in an embodiment, adjustable seat back 70 are mounted between the upper portions of frame 10. In an embodiment, lightweight, breathable, nonflammable fabric is used, but molded foam or elastomeric components can also be used for seat bottom 60 and seat back 70.

It is an objective of the present invention to support as much of the weight of the rider between wheels 40 as possible so that shock to the rider's spine is minimized by the elastomeric-biased, cantilevered swing arm suspension. Therefore, arms 30 may be provided with a plurality of fittings for quick-release axles 50. Also, quick-release axles 50 can be angled with respect to arms 30 to provide a camber in wheels 40 of at least three degrees relative to the forward direction of frame 10 and seat 60 so that, when a user shifts upper body weight from side to side, the wheelchair of the present invention is propelled forward.

Located at opposite sides of frame 10 are balancing wheels 80. Balancing wheels 80 can be attached directly to frame 10, or, in an embodiment, torsion-acting shock absorbers configured between frame 10 and balancing wheels 80. It is also to be understood that a single wheel can be placed along the frontal span of frame 10 in place of balancing wheels 80. Also located near the frontal span of frame 10 is footrest 90. Footrest 90 can be a plate on which a rider can rest his or her feet, or, footrest 90 can be a secondary bar as shown extending from behind the frontal span of frame 10.

Figure 2:
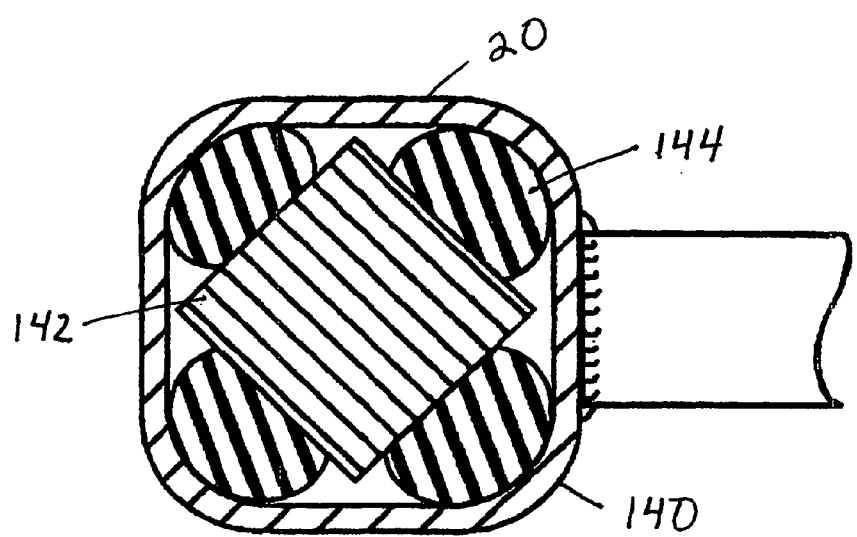
FIG. 2 is a profile of an embodiment of the torsion-damping shock absorber of the present invention.
Figure 3:
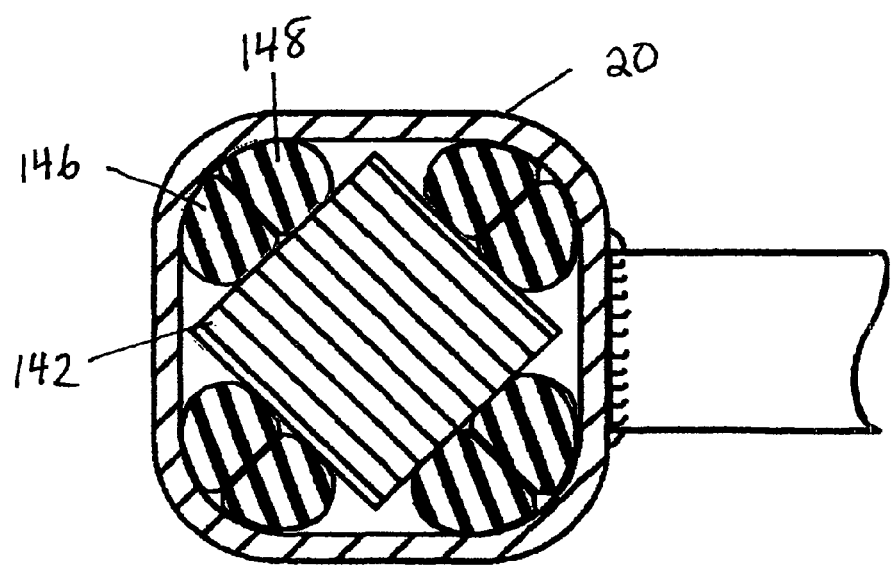
FIG. 3 is a profile of an alternative embodiment of the torsion-damping shock absorber of the present invention.
Figure 4:
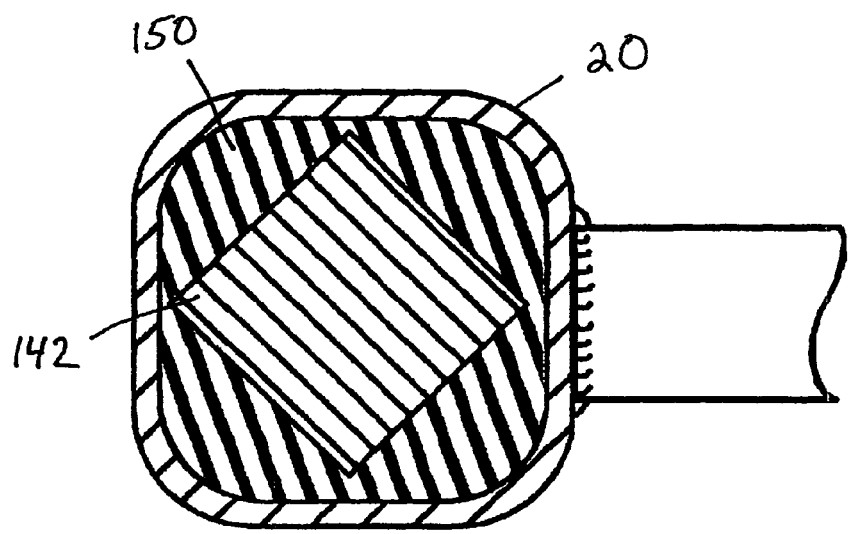
FIG. 4 is the profile of yet another alternative embodiment of the torsion-damping shock absorber of the present invention.

Directing attention to FIG. 2, torsion shock absorbers 20 contain substantially rectangular profile tube 140. Tube 140 houses substantially rectangular section shaft 142 extending centrally therein. Compressible members 144 are trapped between the respective sides of shaft 140. Rotation of shaft 142 compresses compressible members 144 with resultant shock absorption. Compressible members 144 can be placed separately, or, as shown in FIG. 3, multiple compressible members 146, 148 can be placed together. Alternatively, as shown in FIG. 4, compressible material 150 can fill the space surrounding shaft 142 within tube 140. Compressible members 144, 146 and compressible material can be made from elastic materials such as rubber, polymers, and the like. The elasticity can be varied, depending on application and rider preference. Also, torsion shock absorbers similar to torsion shock absorbers 20 can be used in an embodiment on frame 10 between balancing wheels 80 and frame 10.

Directing attention to FIG. 5, the wheelchair of the present invention can be configured with scooter 200 as a power source. Scooter 200 connects to frame 10 with cradle and hook assembly 202. Scooter 200 is a lightweight, collapsible drive train for the wheelchair of the present invention, and incorporates folding mast 204, connected to handlebars 206. On handlebars 206, there is conveniently mounted accelerator 210 and brake 212. In the preferred embodiment, scooter 200 incorporates a battery-powered motor, but combustion engines can also be used in other embodiments. Directing attention to FIG. 6, there is shown scooter 200 in its collapsed position. Knuckle 208 allows folding mast 204 to extend from its locking, upright position to its folded, storage position. In this folded configuration, lightweight scooter 200 can be laid across the lap of a rider desiring to propel the wheelchair manually.

FIG. 7 illustrates cradle and hook assembly 202. Hook 240 is made from flexible material such as soft plastic or rubber so that it can deform around and thus retain the frontmost section of frame 10 again cradle arms 242. In an embodiment, hook 240 incorporates a large, easy to grasp ring that makes it convenient for the seated rider to capture frame 10 within cradle and hook assembly 202. FIG. 8 illustrates frame 10 secured with cradle and hook assembly 202 in its locked position. A tug to hook 240 releases frame 10 from cradle and hook assembly 202.

In embodiments where a stiffer ride is desired than provided by the independent cantilevered swing arm suspension of the present invention, stops can be articulated from the portion of frame 10 below seat 60 to impede the travel of suspension arms 30.

Alternatively, the lower ends of suspension arms 30 can be connected to each other through balljoints attached to each of the suspension arms and having a rod attached between the balljoints. Also, in an embodiment, disc brakes as used in mountain bike applications can be configured on wheels 40 for enhanced downhill steering, as well as normal braking and parking of the wheelchair of the present invention.

While the preferred embodiment of the present invention has been described and illustrated in detail, it is to be understood that numerous changes and modifications can be made to various embodiments of the present invention without departing from the spirit thereof.

What is claimed is:

1. A wheelchair, comprising:
   a frame, said frame presenting a seat for supporting a rider;
   at least two drive wheels, said drive wheels disposed on either side of the seated rider and connected to said frame;
   a pair of torsion-damping shock absorbers, and a pair of independent cantilevered swing arms, said shock absorbers attached to said frame, wherein each swing arm is connected between one of said drive wheels and one of said shock absorbers;
   wherein the torsion-damping shock absorbers include a rectangular-profiled metal tube, a correspondingly rectangular-profiled metal shaft, and confined compressible rods acting there between by resisting rotation of said shaft within said tube.

2. The wheelchair of claim 1, wherein multiple compressible rods are disposed in pairs between said tube and said shaft.

3. The wheelchair of claim 1, wherein said shaft is surrounded by compressible material within said tube.

4. A wheelchair, comprising:
   a frame, said frame presenting a seat for supporting a rider;
   at least two drive wheels, said drive wheels disposed on either side of the seated rider and connected to said frame;
   a pair of torsion-damping shock absorbers, and a pair of independent cantilevered swing arms, said shock absorbers attached to said frame, wherein each swing arm is connected between one of said drive wheels and one of said shock absorbers;
   wherein said shock absorbers include a rectangular-profiled metal tube, a correspondingly rectangular-profiled metal shaft, and confined compressible rods disposed in pairs, the rods acting there between by resisting rotation of said shaft within said tube.

5. A wheelchair, comprising:
   a frame, said frame presenting a seat for supporting a rider;
   at least two drive wheels, said drive wheels disposed on either side of the seated rider and connected to said frame;
   a pair of torsion-damping shock absorbers, and a pair of independent cantilevered swing arms, said shock absorbers attached to said frame, wherein each swing arm is connected between one of said drive wheels and one of said shock absorbers;
   wherein said shock absorbers include a rectangular-profiled metal tube, a correspondingly rectangular-profiled metal shaft, said shaft surrounded by compressible material within said tube, and confined compressible rods acting there between by resisting rotation of said shaft within said tube.

* * * * *